United States Patent [19]

Moffett et al.

[11] Patent Number: 6,060,523

[45] Date of Patent: May 9, 2000

[54] CONTINUOUS PROCESS FOR PREPARING MICROGELS

[75] Inventors: Robert Harvey Moffett, Landenberg, Pa.; Walter John Simmons, Martinsburg, W. Va.; Roy Carlton Jones, Hagerstown, Md.

[73] Assignee: E. I. du Pont de Nemours and Company, Wilmington, Del.

[21] Appl. No.: 09/119,468

[22] Filed: Jul. 20, 1998

[51] Int. Cl.[7] .......................... B01J 13/00; C01B 33/143; C01B 33/26
[52] U.S. Cl. .................... 516/110; 134/22.11; 423/330.1; 423/338; 516/111
[58] Field of Search .................................. 516/79, 82, 85, 516/110, 111; 423/330.1, 338; 134/22.11

[56] References Cited

U.S. PATENT DOCUMENTS

| 2,466,842 | 4/1949 | Elston | 516/82 |
|---|---|---|---|
| 2,999,734 | 9/1961 | Weber et al. | 423/330.1 |
| 3,963,640 | 6/1976 | Smith | 423/330.1 X |
| 4,213,950 | 7/1980 | Mahler | 423/329 |
| 4,954,220 | 9/1990 | Rushmere | 162/168.3 |
| 5,066,420 | 11/1991 | Chevallier | 516/82 |
| 5,176,891 | 1/1993 | Rushmere | 423/328.1 |
| 5,279,807 | 1/1994 | Moffett et al. | 423/338 |
| 5,312,595 | 5/1994 | Moffett et al. | 422/129 |
| 5,503,820 | 4/1996 | Moffett et al. | 423/333 |
| 5,648,055 | 7/1997 | Moffett et al. | 423/328.1 |
| 5,674,323 | 10/1997 | Garcia | 134/22.11 X |
| 5,853,616 | 12/1998 | Moffett et al. | 423/330.1 X |

FOREIGN PATENT DOCUMENTS

| 584727 | 10/1959 | Canada . |
| WO 91/07350 | 5/1991 | WIPO . |

*Primary Examiner*—Richard D. Lovering

[57] ABSTRACT

Silica deposits formed during a continuous process for preparing polysilicate microgel are removed and purged form the process by elastically deforming the vessel walls, reducing plugging.

22 Claims, No Drawings

CONTINUOUS PROCESS FOR PREPARING MICROGELS

BACKGROUND OF THE INVENTION

1. Field of the Invention

The present invention relates to an improved continuous process for preparing polysilicate microgels whereby silica deposition is reduced or eliminated.

2. Description of Related Art

Polysilicate microgels (i.e., aqueous solutions formed by the partial gelation of an alkali metal silicate) are well known in the art. Partial gelation typically is achieved by mixing an alkali metal silicate with a gel initiator, aging the mixture for a short time, and then stopping gelation by diluting the mixture. Mineral acids and alum are the most commonly employed gel initiators. Resulting microgels have commercial utility as a drainage and retention aid in paper making, as a flocculation agent in potable water purification plants, and in similar applications.

Several practical factors currently limit commercial use of polysilicate microgels, although they are excellent flocculents and environmentally benign. For example, microgel solutions necessarily are dilute, making it impractical to ship large volumes long distances. Microgels also are prone to gel and to form silicate deposits in equipment used to prepare the product. These problems can be overcome by equipment design and trained personnel in a factory environment, but present greater difficulty in field applications where the equipment should be relatively easy to operate and maintain.

Batch process for producing microgels age the microgel in large mixing and holding tanks, which not only are expensive but also introduce the problems of product non-uniformity and process control inherent in a batch process. A continuous process to produce and age the microgel is much preferred for consistency in product quality. Unfortunately, silica deposits can be tolerated better in batch holding tanks than in the plumbing of a continuous process, where the deposits plug the equipment causing frequent shut-down for maintenance.

U.S. Pat. Nos. 5,279,807; 5,503,820; and 5,658,055 disclose improved continuous processes for preparing polysilicate microgels wherein silica deposition is greatly reduced by mixing the soluble silicate solution and gel initiators under specific conditions. While the design taught in these patents results in much improved performance, and has found commercial utility, silica deposits still frequently occur that clog the pipes and instruments of the microgel generator. Thus, it remains necessary to periodically shut down the process and purge the deposits by dissolving them with a base, such as sodium hydroxide. It also remains necessary to have a stand-by generator if continuous production is required.

Accordingly, there is a need for further improvements to the continuous process for preparing polysilicate microgels.

SUMMARY OF THE INVENTION

The present invention provides an improved continuous process for preparing polysilicate microgels comprising, in sequence:

(a) Mixing a water soluble silicate aqueous solution and a gel initiator in a mixing vessel to produce an aqueous mixture having a silica concentration of about 0.5% to 15%, by weight; and (b) aging the mixture in an elongated aging vessel to partially gel the mixture; and wherein said mixing vessel and/or said aging vessel are elastically deformable and are temporarily deformed during the process to dislodge deposits formed on the vessel walls and purge the deposits from said vessel.

In a preferred embodiment the step (a) mixing is conducted under the conditions taught in U.S. Pat. Nos. 5,279,807, 5,503,820, and 5,658,055 to minimize the formation of silica deposits. Aluminum ions may be present in step (a) mixing as well, to form a modified polysilicate microgel needing less aging time in step (b).

A flexible hose conveniently is employed as the mixing vessel and/or the aging vessel. The hose is readily deformed by increasing or decreasing pressure within the hose, or by mechanical means, such as by passing the hose through the nip of a pair of rollers that travel the length of the hose. Ultrasonic or sonic sound waves may be employed with semi-rigid or polymeric vessel(s).

DESCRIPTION OF THE PREFERRED EMBODIMENTS

Polysilicate microgels are aqueous solutions formed by the partial gelation of an alkali metal silicate or a polysilicate, such as sodium polysilicate, having in its most common form one part $Na_2O$ to 3.3 parts $SiO_2$ by weight. The microgels typically are composed of water and linked silica particles having a diameter of 1 to 5 mm and a surface area of at least 500 $m^2/g$. The particles are linked together during preparation (i.e., during partial gelation) to form aggregates having three-dimensional networks and chains. The microgel solutions have low S-values compared to commercial colloidal silica. The S-value as defined by Iler and Dalton in J. Phys. Chem. 60(1956), p. 955–957, is the weight % silica in the dispersed phase, which is interpreted as the degree of aggregation of the silica particles. S-values for colloidal silica were shown by Iler and Dalton typically to be in the range of 80% to 90%. The S-values for silica microgel solutions typically are less than 50%, and preferably less than 40%.

At a pH below 5, polysilicate microgels sometimes are referred to as polysilicic acid microgels. As the pH value is raised, these products can contain mixtures of polysilicic acid and polysilicate microgels, the ratio being pH-dependent. As used herein, the term "polysilicate microgel" includes such mixtures of polysilicic acid and polysilicate microgels.

Polysilicate microgels frequently are modified by incorporating aluminate ions into their structure. The aluminum may be present throughout the polysilicate aggregates, or only on their surface, depending on where the aluminum source is added to the process. Aluminum may be added to increase the rate of microgel formation, and thus to decrease the aging time. Aluminum also allows the microgel to retain its charge at low pH conditions. As used herein, the term "polysilicate microgel" includes polysilicate microgels containing aluminum, which sometimes are referred to in the art as polyaluminosilicate microgels.

Mixing

Conventional water soluble silicate solutions and gel initiators may be selected to form a mixture in step (a) having a silica concentration in the range of 0.5% to 15%, preferably 1% to 10%, by weight. The microgel generally will be formed too slowly for practical use at concentrations below 0.5%. Above 15% silica, the rate of gelation is too fast to effectively control.

Suitable gel initiators are well known in the art and include acid exchange resins, mineral acids, organic acids, acid salts, acidic gases, alkali metal salts of amphoteric metal acids (such as sodium aluminate), and organic compounds such as certain anhydrides, amides, esters, lactones, nitriles, and sulfones. Mineral acids, typically sulfuric acid, and alum are common gel initiators. The gel initiator may be added as an aqueous concentrate, up to its solubility limit, or as a dilute solution to facilitate mixing.

When the gel initiator is a mineral acid, the resulting mixture has a pH in the range of 2 to 10 and the acid flow rate (or ratio to silica) typically is controlled by a pH control system. If an organic acid, such as carbonic acid or carbon dioxide, is selected as the gel initiator, flow rate(s) of the gel initiator and/or silicate solution may be controlled volumetrically (within the pH range of 2 to 10) due to the buffering effect of the resulting carbonates. Volumetric control offers the advantage of avoiding pH sensors, which may require frequent cleaning, calibration, and replacement.

If the selected gel initiator is alkaline, such as a solution of sodium bicarbonate or sodium aluminate, it is convenient to control the flow rate(s) of the gel initiator and/or silicate solution volumetrically because both streams are alkaline. The resulting mixture has a pH in the range of 7 to 13.

An aluminum salt, if desired, is conveniently added as a soluble component in the gel initiator or sodium silicate solution, or may be added as a separate stream to the mixture. Excellent polyaluminosilicate microgels are prepared by adding an aluminum salt to an acid gel generator stream in quantities that produce an $Al_2O_3/SiO_2$ mole ratio in the range of 1:1,500 to 1:25, preferably 1:1,250 to 1:50. Alternatively, the polysilicate microgel can be prepared using a polyaluminosilicate solution prepared by reacting an alkali metal aluminate directly with the silicate to form a silicate having an $Al_2O_3/SiO_2$ mole ratio up to about 1:1.

While any mixing conditions may be employed in practicing the invention, it is particularly advantageous to employ the mixing conditions taught in U.S. Pat. Nos. 5,279,807, 5,503,820, and 5,658,055; incorporated herein by reference. The turbulent mixing conditions described therein have been found to significantly reduce formation of gel and silica deposits during aging of the microgel, and are achieved by (i) converging the silicate solution and gel initiator streams at an angle not less than 30 degrees, or (ii) employing an annular mixing device wherein the two streams converge by discharging one stream from an internal pipe into a second stream flowing through an external annular pipe. While turbulent mixing conditions are not necessary for the current invention, it is preferred that the Reynolds number in the mixing zone are at least 1,000, preferably over 6,000.

Aging

The mixture then is aged for a time sufficient to achieve the desired level of partial gelation, which usually takes at least 10 seconds, but not more than 15 minutes. Partial gelation produces the three-dimensional aggregate networks and chains of high surface area silica particles known in the art as polysilicate microgels.

The extent of desired partial gelation will vary with the selected ingredients and the application, but generally is achieved within 10% to 90% of the time that produces complete gelation. Thus, the artisan can readily determine gel time and adjust the selected aging time by varying flow rates through the aging vessel. For instance, length and/or diameter of the aging vessel, and flow pressure, may be optimized for a particular application.

In a continuous process, aging occurs as the mixture passes through an elongated vessel and is essentially completed when the mixture reaches the vessel discharge. The elongated vessel typically has a constant diameter (i.e., a pipe), with the diameter and length being selected to provide the needed residence time for the mixture to "age" to the desired extent. A typical aging vessel will have a diameter in the range of 0.5 cm to 25 cm (¼ to 10 inches), and a length of 60 cm to 150 m (2 to 500 feet), to provide a residence time of 10 seconds to 15 minutes. There generally is no advantage to employing a residence time longer than 15 minutes.

In accordance with the invention, the mixture is formed and/or aged in an elastically deformable elongated vessel (e.g., a pipe or tube) that is temporarily deformed from time-to-time to dislodge deposits that form on the vessel walls. The dislodged deposits are purged from the vessel by the aging mixture, as it continuously passes through the vessel. The deposits are composed of silica; there is no need to segregate and remove them from the mixture exiting the vessel for many applications. Advantages of the invention are especially apparent when applied to the mixing and early aging steps where deposits are particularly prone to form.

The vessel may house auxiliary equipment such as valves, mixers, and process instrumentation. The vessel is constructed with a material having (i) an elasticity greater than that of silica deposits, and (ii) surface characteristics such that deformation of the vessel will overcome adhesive forces between the vessel and the deposits, thereby causing the deposits to be dislodged when the vessel is deformed. The selected material will vary with the means selected to temporarily deform the vessel walls. The material typically will have a smooth surface to aid silica deposit removal.

In one embodiment, the vessel walls are temporarily deformed by either increasing or decreasing the vessel internal pressure to expand or contract the walls. Such pressure variations may be achieved by any method known in the art, such as (i) periodically varying the pressure of the feed streams; (ii) using a feed pump having discontinuous feed characteristics, such as a piston pump; (iii) periodically varying outflow resistance by a programmed control valve; (iv) periodically introducing a liquid or gas that does not unduly affect the aging process; or combinations thereof. Examples of suitable materials for vessel construction, in this embodiment, include polymeric materials such as vinyl plastic, "Viton" co-fluoropolymer, "Teflon" polytetrafluoroethylene, silicone rubber, neoprene rubber and other rubbers or elastomers that withstand periodic elastic deformation without failure of cracking, and that are chemically resistant to the aging mixture.

In a second embodiment, the vessel walls are temporarily deformed by applying a mechanical force to the vessel walls. The mechanical force can be applied by any means known in the art including, but are not limited to, squeezing or bending and releasing the walls by a roller, press or other mechanical device, and varying the exterior pressure of a surrounding fluid. The mechanical force can be applied by stretching the vessel lengthwise to decrease its diameter, and then releasing it. Especially preferred is a process wherein one or more pair of rollers move along the longitudinal axis of a tubular vessel. Similar materials will be selected for this embodiment as those described above wherein internal vessel pressure is varied.

In a third embodiment, the vessel walls are temporarily deformed by a vibrating force, such as by vibrations transmitted to the vessel from a surrounding liquid having a submerged vibrator. Typically an ultrasonic vibrator will be selected for this purpose. Alternatively, the mixture contained in the vessel may be vibrated and transmit the vibrations, causing elastic deformation of the vessel. In this embodiment the vessel typically is constructed of a semi-rigid material, such as steel or stainless steel, having greater elasticity than the silica deposits or a polymeric material such as those described above.

Industrial Use

Polysilicate microgels generally will be treated to arrest, or minimize, further gel formation. The treatment may be a simple dilution step that reduces the silica concentration to less than about 10%, preferably less than 5%, by weight, or a pH adjustment step, or a combination of both dilution and pH adjustment, whereby gelation is halted or retarded or both. Other techniques known in the art may be selected to arrest gel formation as well.

The microgel then may be stored or consumed in its intended use. Alternatively, if the microgel will be consumed immediately, or if further gelation will be within acceptable limits for the intended application, it will not be necessary to dilute or adjust pH of the microgel. If desired, the aged microgel may be filtered to remove unacceptably large silica deposits that were dislodged while practicing the invention.

Polysilicate microgels prepared in accordance with the invention may be used in conventional applications consuming such microgels, as well as in new applications rendered practical because the microgels can be reliably produced in the field. For instance, the microgels may be used as a flocculating agent to remove solids from aqueous suspensions, or as a paper retention aid, frequently in conjunction with other polymers and/or chemicals used for that purpose.

Having described the invention, it now will be illustrated, but not limited, by the following examples.

EXAMPLES

Example 1

A polyaluminosilicate microgel solution was prepared by reacting dilute sodium silicate solution with dilute sodium aluminate solution in an annular junction mixer. That is, a sodium silicate solution containing 2 wt. % $SiO_2$ was fed into an annular mixing zone at 1.9 gpm (7.2 liter per minute) via a Swagelok ½ inch (1.27 cm) tee. The tee was connected to 100 feet (30.5 meters) of ½ inch (1.27 cm) diameter reinforced Tygon (Type B44-4K formulation of vinyl tubing, available from Norton Performance Plastics Corp., Wayne, N.J.). The sodium aluminate solution containing 2 wt. % $Al_2O_3$ was introduced into the annular mixing zone via a ¼ inch (0.635 cm) diameter stainless steel tubing through the ½ inch tee approximately 8" (20 cm) downstream of the silicate. The aluminate was fed into the mixing zone at such a rate as to maintain a ⅙ $Al_2O_3/SiO_2$ weight ratio. Mixing of the silicate and aluminate was accomplished in the Tygon tubing.

Silica deposits inside the Tygon tubing were readily apparent after approximately one hour of operation. Removal of the deposits was accomplished by compressing the Tygon tubing slightly by passing the tubing between two plastic rollers. The hose was found to be free of silicate deposits after one pass of the rollers. A total of approximately 400 gallons (1514 liters) of polyaluminosilicate microgel solution was prepared using the apparatus described. All silicate deposits were removed from the apparatus by deforming the hose with the plastic rollers. The polyaluminosilicate solution was found to have good utility as a papermaking retention and drainage aid.

Example 2

This example demonstrates how ultrasonic vibration can be used to elastically deform a processing vessel to prevent formation of silica deposits when producing a polysilicate microgel solution. A dilute 3.2 ratio sodium silicate and sulfuric acid were mixed together in a stainless steel Tee junction mixer so as to produce a solution containing 3.2 wt. % $SiO_2$ at a pH of 8.7 at an average flow rate of 13 gpm (49 liter per minute). After exiting the Tee junction mixer, the solution was introduced into a 7 feet (2.1 meter) long section of ⅜ inch ID (0.95 cm) reinforced Tygon tubing. The Tygon tubing was then connected to an 8-inch (20 cm) long section of ½ inch OD (1.27 cm) stainless steel tubing which was then connected to a 6-inch (15 cm) long section of Neoprene-lined elastomeric hose. Downstream from the Neoprene-lined hose a Lakewood Instruments model 72 pH electrode assembly was installed in-line to control the pH of the silicate/acid mixture. The Neoprene-lined hose, the stainless steel tubing and a portion of the Tygon tubing were submerged in a Branson model 3200 ultrasonic bath operating at 47 kHz. After 6.5 hours of operation no silica deposits could be seen in any of the tubing in submerged in the ultrasonic bath. An obvious coating of silica deposits was observed on the pH electrode assembly which was not in the ultrasonic bath. The silica deposits were removed from the pH electrode assembly by soaking the assembly in warm sodium hydroxide solution. Analysis of the sodium hydroxide solution determined 0.77 grams of $SiO_2$ had been deposited on the pH electrode assembly.

Example 3

This example demonstrates how ultrasonic vibration can be used to elastically deform a processing vessel to prevent formation of aluminosilicate deposits when producing a polyaluminosilicate microgel solution. 100 ml/min of dilute 3.2 ratio sodium silicate containing 2 wt. % $SiO_2$ was mixed in a Tee junction mixer with 20 ml/min of sodium aluminate solution containing 2 wt. % $Al_2O_3$. The mixed solution was pumped through a length of ¼ inch OD (0.635 cm) stainless steel tubing which was connected to a length of Nalgene 180 clear plastic premium tubing, VI grade, 5/32 inch ID (0.40 cm). A portion of the Nalgene tubing was submerged in a Branson model 3200 ultrasonic bath operating at 47 kHz. All of the stainless steel tubing except for approximately 1 inch (2.54 cm) at each end was submerged in the ultrasonic bath. Aluminosilicate deposits were apparent in the Nalgene tubing outside of the ultrasonic bath after approximately 1 hour of running. The deposits in the Nalgene tubing outside of the bath were easily removed by deforming the tubing such as by stretching, bending or squeezing.

After 4 hours of polyaluminosilicate microgel production, no deposits were found in the Nalgene tubing that was submerged in the ultrasonic bath. No deposits were found in the stainless steel tubing, indicating that the ultrasonic bath caused elastic deformation of the stainless steel tubing submerged in the bath and for some distance outside of the bath.

Example 4

This example demonstrates that a glass processing vessel with low elastic deformation when stressed is not satisfactorily elastically deformed so as to create a stress greater than the adhesion strength of the aluminosilicate deposits formed when producing a polyaluminosilicate microgel, even when exposed to ultrasonic vibration. 100 ml/min of dilute 3.2 ratio sodium silicate containing 2 wt. % $SiO_2$ was mixed in a Tee junction mixer with 20 ml/min of sodium aluminate solution containing 2 wt. % $Al_2O_3$. The mixed solution was pumped through a 6 inch (15 cm) length of 5/32 inch ID (0.40 cm) glass tubing. Approximately 3 inches (7.5 cm) of the glass tubing was submerged in a Branson model 3200 ultrasonic bath operating at 47 kHz. The glass tubing was connected to a length of ¼ inch ID (0.635 cm) clear vinyl tubing, a portion of which was also submerged in the ultrasonic bath. Aluminosilicate deposits were visually apparent after approximately 1 hour of operation in the entire length of glass tubing (both in and out of the ultrasonic bath) and the portion of the Nalgene tubing that was outside of the ultrasonic bath. After 4 hours of operation the entire length of glass tubing was coated with aluminosilicate deposits. The Nalgene tubing submerged in the bath was visually free from deposits.

What is claimed is:

1. A continuous process for preparing a polysilicate microgel comprising, in sequence:
   (a) mixing a water soluble silicate aqueous solution and a gel initiator in a mixing vessel to produce an aqueous mixture having a silica concentration of about 0.5% to 15%, by weight; and
   (b) aging the mixture in an elongated aging vessel to partially gel the mixture;
   wherein said mixing vessel and/or said elongated aging vessel are elastically deformable and are temporarily deformed during the process to dislodge deposits formed on the vessel walls and purge the deposits from said vessel.

2. The process of claim 1 wherein the elongated aging vessel is temporarily deformed by increasing internal pressure of said vessel.

3. The process of claim 1 wherein the vessel is temporarily deformed by decreasing internal pressure of said vessel.

4. The process of claim 1 wherein the vessel is temporarily deformed by periodically varying the outlet flow resistance.

5. The process of claim 1 wherein the vessel is temporarily deformed by applying a mechanical force to said vessel.

6. The process of claim 5 wherein the mechanical force is applied by a roller, press or external pressurized fluid.

7. The process of claim 6 wherein the mechanical force is applied by one or more pair of rollers moved along the longitudinal axis of said vessel.

8. The process of claim 1 wherein the vessel is temporarily deformed by exposure to vibrations.

9. The process of claim 8 wherein said vibrations are transmitted to the vessel from a surrounding liquid having a submerged vibrator.

10. The process of claim 8 wherein the mixture being aged in said elongated vessel transmits the vibrations to the vessel.

11. A continuous process for preparing a polysilicate microgel comprising (a) mixing a feed stream comprising a water soluble silicate aqueous solution and another feed stream comprising a gel initiator in a mixing vessel to produce an aqueous mixture having a silica concentration of about 0.5% to 15%, by weight; and (b) aging the mixture in an elongated aging vessel to partially gel the mixture wherein
   said mixing vessel, said elongated aging vessel, or both are elastically deformable and are temporarily deformed during the process to dislodge deposits formed on the vessel walls and purge the deposits from said mixing vessel, said elongated aging vessel, or both; and
   said mixing vessel, said elongated aging vessel, or both are temporarily deformed by a method selected from the group consisting of (1) increasing or decreasing the internal pressure of said mixing vessel, said elongated aging vessel, or both; (2) applying a mechanical force to said mixing vessel, said elongated aging vessel, or both; and (3) exposure to vibrations.

12. The process of claim 11 wherein said increasing or decreasing the internal pressure of said mixing vessel, said elongated aging vessel, or both is carried out by a method selected from the group consisting of (i) varying the pressure of said feed streams; (ii) using a feed pump having discontinuous feed characteristics; (iii) varying outflow resistance by a programmed control valve; (iv) introducing a liquid or gas that does not unduly affect the aging; and (v) combinations thereof.

13. The process of claim 11 wherein said mixing vessel, said elongated aging vessel, or both are temporarily deformed by increasing the internal pressure of said vessel.

14. The process of claim 11 wherein said mixing vessel, said elongated aging vessel, or both are temporarily deformed by decreasing the internal pressure of said vessel.

15. The process of claim 11 wherein said mixing vessel, said elongated aging vessel, or both are temporarily deformed by varying the outlet flow resistance.

16. The process of claim 11 wherein said mixing vessel, said elongated aging vessel, or both are temporarily deformed by applying a mechanical force to said mixing vessel, said aging vessel, or both.

17. The process of claim 16 wherein said mechanical force is applied by a roller, press or external pressurized fluid.

18. The process of claim 16 wherein said mechanical force is applied by one or more pair of rollers moved along the longitudinal axis of said mixing vessel, said elongated aging vessel, or both.

19. The process of claim 16 wherein said mixing vessel, said elongated aging vessel, or both is temporarily deformed by exposure to vibrations.

20. The process of claim 19 wherein said vibrations are transmitted to the vessel from a surrounding liquid having a submerged vibrator.

21. The process of claim 19 wherein the mixture being aged in said elongated aging vessel transmits the vibrations to said elongated aging vessel.

22. A continuous process for preparing a polysilicate microgel comprising (a) mixing a solution comprising sodium silicate and sulfuric acid in a mixing vessel to produce a mixture having a silica concentration of about 0.5% to 15%, by weight; and (b) aging the mixture in an elongated aging vessel to partially gel the mixture wherein said mixing vessel, said elongated aging vessel, or both are elastically deformable and are temporarily deformed during the process by increasing or decreasing the internal pressure of said mixing vessel, said elongated aging vessel, or both by a method selected from the group consisting of (i) varying the pressure of the feed streams providing the sodium silicate and sulfuric acid; (ii) using a feed pump having discontinuous feed characteristics; (iii) varying outflow resistance by a programmed control valve; (iv) introducing a liquid or gas that does not unduly affect the aging; and (v) combinations thereof.

* * * * *